United States Patent
Agrawal

(10) Patent No.: US 7,070,330 B2
(45) Date of Patent: Jul. 4, 2006

(54) HYDRODYNAMIC FLUID FILM BEARING HAVING A KEY-LESS FOIL

(75) Inventor: Giridhari L. Agrawal, Simsbury, CT (US)

(73) Assignee: R & D Dynamics Corporation, Bloomfield, CT (US)

( * ) Notice: Subject to any disclaimer, the term of this patent is extended or adjusted under 35 U.S.C. 154(b) by 147 days.

(21) Appl. No.: 10/782,562

(22) Filed: Feb. 19, 2004

(65) Prior Publication Data

US 2005/0185865 A1    Aug. 25, 2005

(51) Int. Cl.
*F16C 17/03*    (2006.01)
(52) U.S. Cl. ...................... 384/106; 384/103
(58) Field of Classification Search ............... 384/106, 384/103, 104, 105
See application file for complete search history.

(56) References Cited

U.S. PATENT DOCUMENTS

| | | | |
|---|---|---|---|
| 3,615,121 A | 10/1971 | Barnett et al. | 308/9 |
| 4,415,280 A | 11/1983 | Agrawal | 384/103 |
| 4,415,281 A | 11/1983 | Agrawal | 384/103 |
| 4,549,821 A | 10/1985 | Kawakami | 384/103 |
| 4,950,089 A | 8/1990 | Jones | 384/103 |
| 5,634,723 A * | 6/1997 | Agrawal | 384/106 |
| 2005/0163407 A1 * | 7/2005 | Kang et al. | 384/106 |

FOREIGN PATENT DOCUMENTS

JP    58-160619    9/1983

OTHER PUBLICATIONS

European Search Report for Serial No. EP 05 002731 dated Dec. 20, 2005.

* cited by examiner

*Primary Examiner*—Lenard A. Footland
(74) *Attorney, Agent, or Firm*—McCormick, Paulding & Huber LLP

(57) ABSTRACT

An improved and enhanced hydrodynamic fluid film bearing for rotatably supporting a shaft journal is provided and includes a stationary retaining member, at least two generally cylindrical foil elements attached to one another and forming an anti-rotation fin, and a generally cylindrical resilient backing member. The retaining member has an inner surface defining a cylindrical opening for receiving a shaft journal. The inner surface also includes a longitudinally extending slot in which the anti-rotation fin formed by the foil elements is mounted so that the foil elements line at least a portion of the cylindrical opening. The resilient member is also disposed within the cylindrical opening generally concentric to and radially outward from the foil elements. The foil elements may be discrete elements attached together to form the anti-rotation fin, or alternatively formed from a single foil with a bend defining the anti-rotation fin.

17 Claims, 1 Drawing Sheet

HYDRODYNAMIC FLUID FILM BEARING HAVING A KEY-LESS FOIL

FIELD OF THE INVENTION

This invention relates generally to hydrodynamic fluid film bearings and more particularly to such bearings employing one or more foils to establish and maintain a fluid film within the bearing and a resilient backing member accommodating deflections of foils and excursions of the rotating portion of the bearing.

BACKGROUND OF THE INVENTION

Generally, hydrodynamic fluid film bearings operate on the principle that a rotating member, such as a shaft or thrust runner, and an adjacent element, such as a smooth foil or the like, establish and maintain a pressurized fluid film layer therebetween. The fluid film layer, also referred to in the industry as a fluid film wedge, provides lubricant-free support for the rotating member. Often, a resilient backing means or spring is disposed between a foil and a stationary member (e.g., a cartridge, retainer or base) in which the rotating member is axially disposed to accommodate deflections of the foil due to the pressurization thereof by the fluid film layer and excursions of the rotating member due to bearing loading and imbalances thereof such as whirl and the like.

Successful bearing designs have used multiple foil layers in the form of a single coiled foil or multiple foil elements. A multi-layer foil construction is advantageous in certain respects. For example, a multi-layer foil is believed to enhance coulomb damping which provides energy dissipation particularly suitable for hydrodynamic bearings. Moreover, such multi-layer foil constructions exhibit larger rotor excursion tolerance, good accommodation of differential expansion of the foils, accommodation of manufacturing misalignments, accommodation of foil imperfections, tolerance to contaminants, and good wipe-wear characteristics at high speeds, as well as during starting and stopping.

A generally accepted foil design in the industry, generally disclosed and claimed in U.S. Pat. Nos. 4,415,280 and 4,415,281, incorporated herein by reference, is shown in FIG. 1. For example, a hydrodynamic fluid film journal bearing 10 includes a stationary retaining member or cartridge 12, also known as a shell, retainer or base, which encloses a rotary shaft or journal 14 adapted for connection to a high speed rotor. The retaining member 12 and the journal 14 combine to define an annular spacing or clearance 16. The retaining member includes an inner surface having a longitudinally extending keyway 18 formed therein.

A first open or split, generally cylindrical-shaped, smooth foil element 20 is disposed within the annular spacing 16 and fixed along an edge to a side of a key 22 slidably received within the keyway 18. A second open or split, generally cylindrical-shaped, smooth foil element 24 is provided inwardly of and concentric to the first foil element 20 within the annular spacing 16. The second foil element 24 is also fixed along an edge to the key 22. In accordance with the arrangement shown in FIG. 1, the first foil element 20 may be referred to as an intermediate or contact foil, while the second foil element 24 may be referred to as a top foil. During starting and stopping of rotation of the journal 14, the top foil often rubs against the journal 14 until sufficient fluid film is created. Accordingly, the top foil is commonly provided with a low-friction coating on the radial inner surface.

A corrugated resilient backing member or spring 26 is disposed within the annular spacing 16 between the retaining member 12 and the foil elements 20, 24. The spring 26 is also of a generally open or split cylindrical shape and fixed along an edge to the key 22. In general, the foil elements 20, 24 are attached to the key 22, and are mounted within the retaining member 12, such that the extension of the first foil element 20 is in a direction opposite that of the second foil element 24.

Since the foil elements 20 and 24 and the spring 26 are discrete members and are not coiled from a single foil element, telescoping of these members due to axial loading and resulting in possible damage to the foils by rubbing with the journal 14 is minimized. Additionally, the provision of discrete foil elements, rather than a single coiled foil allows foils of varying properties of thickness, resilience and the like to be used for precise tailoring of properties.

Hydrodynamic fluid film bearings, such as those of the design shown in FIG. 1, are commonly used in turbo-compressor units employed in modern air cycle machinery for aircraft cooling and ventilation. While multi-layer foil designs exhibit the above-identified advantages, improvements in such bearings in the areas of manufacturability, damping characteristics and compliancy, ease in assembly/disassembly and foil replacement, resistance to foil telescoping, and convenience in providing multi-thickness foil layers are continually being sought. Moreover, the key arrangement shown in FIG. 1 has several drawbacks. Most notably, satisfactory operation of the bearing requires perfection in manufacture of the foils. That is, the key must be perfectly straight and the foils must be attached perfectly square to the key. Any gaps, curves or misalignment will affect the load carrying capacity of the bearing, and may also lead to premature failure of the bearing. Because there are at least two foil elements attached to the key, alignment is more critical. Any imperfections in the key, the foil elements, or the welds will affect operation of the bearing. It is often cumbersome and difficult, and hence expensive, to attach thin foil elements to the small cross-sectional area of the key.

For satisfactory operation of the bearing, the key must also be maintained perfectly straight within the keyway of the retaining member. Keys are susceptible to bending during both manufacture and operation. Further, the key may tilt or twist within the keyway during operation in response to forces exerted on the foil elements. Any bends or twists in the key lead to reductions in load carrying capacity and compliancy of the bearing, and may ultimately cause of failure.

Hydrodynamic fluid film bearings work because of their compliancy. In the key design of FIG. 1, it has been determined that the bearing has low compliancy in the direction of the key. In effect, there is a "hard spot" over the key. With respect to compliance, this hard spot conflicts with the nature of the bearing and the fluid film created therein during rotation of the journal. As a result, the bearing has less load capacity in the direction of any hard spots, namely the location of the key. Further, the bearing has less shock load resistance and damping in that direction.

The present invention, as detailed in the illustrations and description below aims at reducing or eliminating these drawbacks in hydrodynamic fluid film bearings.

SUMMARY OF THE INVENTION

The present invention resides in a hydrodynamic fluid film bearing, comprising a stationary retaining member, at least two generally cylindrical foil elements attached to one another and forming an anti-rotation fin, and a generally cylindrical resilient backing member. The retaining member has an inner surface defining a cylindrical opening for receiving a shaft journal. The inner surface also includes a longitudinally extending slot in which the anti-rotation fin formed by the foil elements is mounted so that the foil elements line at least a portion of the cylindrical opening. The resilient member is also disposed within the cylindrical opening generally concentric to and radially outward from the foil elements. The foil elements may be discrete elements attached together to form the anti-rotation fin, or alternatively formed from a single foil with a bend defining the anti-rotation fin.

In a preferred embodiment of the present invention, the foil elements extend in opposite circumferential directions within the cylindrical opening of the retaining member from the slot and have respective free ends overlapping one another.

The bearing design of the present invention provides several advantages over the prior art key design. For example, manufacture of the foil bearing is easier because the key, and therefore the requirement of perfection in the key shape and surfaces, has been eliminated. The anti-rotation fin of the present invention may bend, tilt or twist without the danger of failure of the bearing or reduce load carrying capacity. The danger of failure due to hard spots is also reduced with the elimination of the key. The use of an anti-rotation fin maintains high compliancy, high load capacity, and high shock resistance capacity of the bearing even in the direction of the fin.

DETAILED DESCRIPTION OF THE INVENTION

Figure 2:
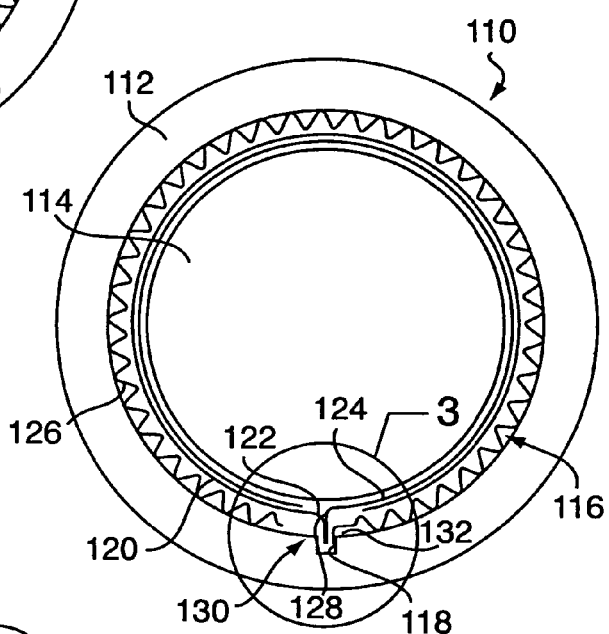
FIG. 2 is an end view of a hydrodynamic fluid bearing in accordance with the present invention.
Figure 3:
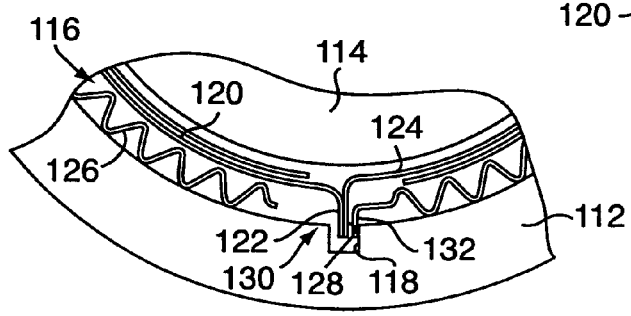
FIG. 3 is an enlarged, fragmentary end view of the hydrodynamic fluid film bearing of FIG. 2.

Referring to FIGS. 2 and 3, a hydrodynamic fluid film bearing 110 of the present invention includes a stationary retaining member or cartridge 112 having an inner surface defining a cylindrical opening which encloses a rotary shaft or journal 114 adapted for connection to a high speed rotor for such equipment as high speed electric motors or bladed rotors for use in any type of high speed turbo-compressors such as those employed in air cycle machinery. An annular spacing or clearance 116 is defined between the retaining member 112 and the journal 114. A longitudinally extending slot 118 is provided on the inner surface of the retaining member 112 with an opening into the annular spacing 116.

A first smooth foil element 120 being generally of an open or split (along the side) cylindrical shape is disposed within the annular spacing 116. The first foil element 120 extends in a generally circumferential direction and includes a fin portion 122 projecting from an edge of the opening of the foil element 120 in a radial direction generally normal to the circumferential extension of the element.

Figure 4:
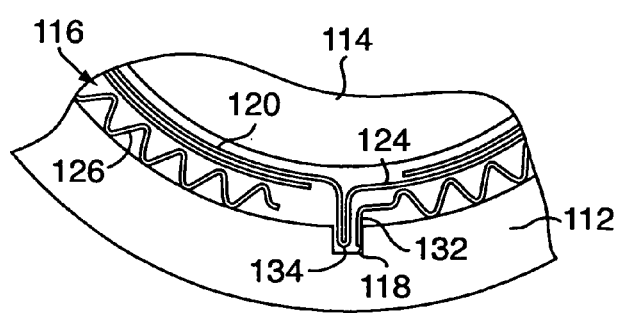
FIG. 4 is an enlarged, fragmentary end view of an alternate embodiment of the hydrodynamic fluid film bearing of the present invention.

As shown in FIGS. 2 and 3, a second smooth foil element 124 being generally of an open or split (along the side) cylindrical shape is disposed within the annular spacing 116 radially inwardly of and concentric to the first foil element 120. Alternatively, the second foil element 124 may be disposed within the annular spacing 116 radially outwardly of and concentric to the first foil element 120, as shown in FIG. 4.

As is generally known to one of ordinary skill in the art, the inner foil element, also known as the top foil, rubs the journal 114 during starting and stopping of rotation of the journal 114 until sufficient fluid film is created in the annular spacing 116, and accordingly the radial inner surface of the top foil is preferably provided with a low-friction coating to reduce the friction in such situations. The present invention covers designs where either the first foil element 120 or the second foil element 124 may be positioned as the inner, or top, foil adjacent the journal 114. In either design, the top foil preferably extends in a generally circumferential direction within the annular spacing 116 that is opposite to the rotational direction of the journal 114. In a preferred embodiment, the outer foil element, also known as the intermediate or contact foil, extends in a generally circumferential direction within the annular spacing 116 that is the same as the rotational direction of the journal, and opposite to the direction of the top foil.

Further, a longitudinally flexible, corrugated resilient backing member or spring 126 is disposed within the annular spacing 116 adjacent the inner surface of the retaining member 112. Preferably, the spring 126 is positioned between the retaining member 112 and the outer, or intermediate/contact, foil element. As shown in FIGS. 2 and 3, the spring 126 is disposed between the retaining member 112 and the first foil element 120. In the alternative embodiment shown in FIG. 4, the spring 126 is disposed between the retaining member 112 and the second foil element 124. The spring 126 is of a generally open or split (along the side) cylindrical shape extending in a generally circumferential direction.

The second foil element 124 extends in a generally circumferential direction and includes a fin portion 128 projecting from an edge of the opening of the foil element 124 in a radial direction generally normal to the circumferential extension of the element. The respective flange portions 122 and 128 of the foil elements 120 and 124 are attached to one another to form an anti-rotation fin 130 slidably receivable within the slot 118 provided in the retaining member 112. The foil elements 120 and 124 are therefore mounted within the retaining member 112 and restrained from rotation by inserting the fin 130 into the slot 118. The longitudinal ends of the slot 118 are closed to capture the foil elements 120, 124 in the retaining member 112. The use of the fin 130, inserted into the slot 118, readily allows bearing inserts to be changed for tailoring bearing damping to bearing load conditions.

Though shown as discrete elements in FIGS. 2 and 3, the first foil element 120 and the second foil element 124 may be formed from a single piece of foil, as shown in FIG. 4. A bend 134 is provided to divide the foil material into the first and second foil elements 120 and 124. To assemble the bearing 110, the bend 134 is inserted into the slot 118 to mount the foil elements 120 and 124 within the retaining member 112, as well as to restrain the foil from rotating with the journal 114.

The spring 126 may also include a flange portion 132 projecting from an edge of the opening of the spring 126 in a radial direction generally normal to the circumferential extension of the spring 126. The flange portion 132 of the spring 126 may also be inserted into the slot 118 to mount the spring 126 into position with respect to the retaining member 112 and the foil elements 120 and 124 and restrain the spring 132 from rotation. The flange portion 132 may be affixed to the fin 130, or the bend 134, or alternatively retained in the slot 118 by surface contact with the fin 130 or the bend 134. Spring retention where the spring 126 is not positively attached to the fin 130, the bend 134, or either of the foil elements 120 and 124 lessens the criticality of the angular disposition of the flange portion 132 of the spring 126 from the remainder thereof for proper bearing operation, thus contributing to the ease of bearing manufacturability.

Figure 1:
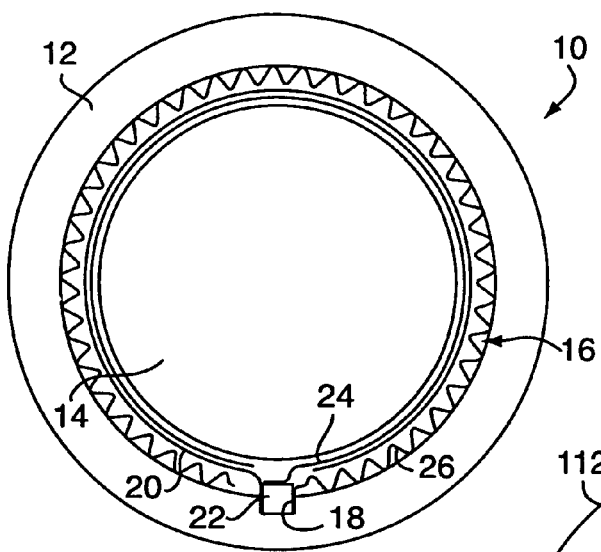
FIG. 1 is an end view of a prior art hydrodynamic fluid film bearing.

Preferably, the slot 118 of the retaining member 112 has complementary shape and width with the fin 130 and the spring flange portion 132. That is, for example, the width of the slot 118 is designed to be essentially equal to the thickness of the first foil element flange portion 120, the second foil element flange portion 124 and the spring flange portion 132, combined. Therefore, the slot 118 typically has a smaller width than in the keyway 18 of the prior art design shown in FIG. 1. Preferably, the depth of the slot 118 is greater than the length of the fin 130 or the bend 134. For example, the space between the end of the fin 130, or the bend 134, and the bottom of the slot 118 may be on the order of 0.030 inches. In general, the smaller volume occupied by the fin 130 or the bend 134 provides the bearing with greater compliance during operation. In the key design of the prior art, the key 22 is less free to move, and thus creates a "hard spot" that reduces compliancy, load carrying capacity, and shock resistance capacity in the direction of the key.

As those of ordinary skill in the art will recognize, disturbances to the journal 114 are damped by compression or squeezing of the fluid film between the journal 114 and an adjacent foil element (e.g., second foil element 124 as shown in FIGS. 2 and 3; first foil element 120 as shown in FIG. 4), compression of the corrugations in the spring 126, and coulomb damping.

The bearing 110 operates under the basic principle of generation of hydrodynamic pressure in the portion of the annular spacing 116 between the journal 114 and the foil elements 120 and 124. Under theoretical no load conditions, the geometric center of the journal 114 coincides with the geometric centers of the retaining member 112 and the cylinders formed by the foil elements 120 and 124. However, under actual operating conditions, some load will be exerted on the journal 114 which eccentrically displaces the geometric center of the journal 114 from the geometric centers of the retaining member 112 and the foil elements 120 and 124, thereby defining a wedge-shaped clearance with the foil elements 120 and 124. Rotation of the journal 114 causes its geometric center to orbit about the geometric center of the foil elements 120 and 124 causing the wedge-shaped clearance to so orbit the foil elements' center. As those of ordinary skill in the art will recognize, the eccentric positioning of the journal 114 with respect to the foil elements 120 and 124, and the continuous rotation of the journal 114, cause the establishment and maintenance of regions of high-pressure and low-pressure between the journal 114 and the foil elements 120 and 124. This causes flow of fluid from the high-pressure zone to the low-pressure zone resulting in a squeezing of the fluid between the journal 114 and the foil elements 120 and 124. This phenomenon defines supporting fluid film that supports radial loads on the bearing 110 and prevents the journal 114 from contacting the foil elements 120 and 124.

The spring 126 serves two purposes. First, the spring 126 provides a resilient deformable backing which aids in the formation of the supporting fluid film wedge, described hereinabove, by accommodating certain foil deflections due to the pressurization thereof by the film. The spring 126 also provides an overall load carrying capacity and accommodation of journal excursions due to journal loading and imbalances. Preferably, for damping and stability, the spring 126 should have a relatively low characteristic spring rate, while for adequate load capacity and limitation of shaft excursions, the spring 126 should have a relatively high spring rate. Accordingly, a dual or bilinear spring rate in the form of a single spring, such as disclosed in U.S. Pat. No. 4,415,281, incorporated herein by reference, is preferred.

Though shown and described above as being mounted in the bearing 110 by inserting the flange portion 132 of the spring 126 into the slot 118, the present invention is not limited in such respect, and the spring 126 may be retained in the bearing 110 in alternative ways, including by welding a portion of the spring 126 to the inner wall of the retaining member 112. Alternatively, the spring 126 is described above as being discrete from the first and second foil members 120 and 124. However, the present invention also covers a design whereby the spring 126 is attached to the first and second foil elements 120 and 124, for example, by welding the spring flange portion 132 to the fin 130 or the bend 134.

For enhanced coulomb damping, it has been the practice in the art to provide multiple foil layers in the annular spacing between the journal and the retaining member, one example of such multiple layers being that described above and shown in FIG. 1. In accordance with the present invention, and as shown in FIGS. 2 and 3, to enhance coulomb damping, the second foil element 124 is provided radially inwardly of and concentric to the first foil element 120. The first and second foil elements 120 and 124 overlap within the annular spacing 116. The spring 126 is disposed radially outwardly of and concentric to the first foil element 120. Disturbances to the journal 114 are therefore damped in part by coulomb damping between the first and second foil elements 120 and 124, as well as between the first foil element 120 and the apices of the spring 126.

The above noted coulomb damping is further enhanced by mounting the foil elements 120 and 124 and the spring 126 to the retaining member 112 such that one or more of the elements extends from the mounted edge in a circumferential direction opposite that of an adjacent element. As shown in FIGS. 2 and 3, radially outward pressure of the fluid film between journal 114 and the second foil element 124 urges that foil element outwardly, opening the cylinder formed by that foil element and imparting a generally clockwise movement to that cylinder. Coulomb damping is achieved by a rubbing of the second foil element 124 against the adjacent first foil element 120. This coulomb damping is enhanced by the extension of the first foil element 120 in a circumferential direction opposite that of the second foil element 124. As pressurization of the fluid film urges the second foil element 124 outwardly, it, in turn, urges the first foil element 120 outwardly causing that foil element to open and move counterclockwise—i.e., in a direction opposite that of the second foil element 124. It will be appreciated by those of ordinary skill in the art that movement of the foil elements in directions opposite to one another achieves greater energy dissipation and damping than movement in the same circumferential direction as would be the case where the foil layers extend in the same direction from the mount thereof, or equivalently, where the foils comprise adjacent layers of a single coiled foil element.

Still referring to FIGS. 2 and 3, outward movement of the foil elements 120 and 124, under pressure from the fluid film, urges the foil elements 120 and 124 against the spring 126, causing the spring 126 to open outwardly and move in a generally clockwise direction. Since the first foil element 120 moves in a generally counterclockwise direction when pressurized, enhanced coulomb damping is achieved due to opposed movements of the spring 126 and the first foil element 120.

FIG. 4 is illustrative of an alternative embodiment with respect to the issue of coulomb damping. Specifically, the second foil element 124 in this embodiment is provided within the annular spacing 116 radially outwardly of and concentric to the first foil element 120. The spring 126 is therefore adjacent to the second foil element 124, and, as such, is disposed radially outwardly of and concentric thereto. Disturbances to the journal 114 are therefore damped in part by coulomb damping between the first and second foil elements 120 and 124, as well as between the second foil element 124 and the apices of the spring 126. As shown, the first foil element 120 still extends in a circumferential direction opposite to the direction of the spring 126. The second foil element 124 runs in the same circumferential direction as the spring 126, but in an opposite circumferential direction from the first foil element 120.

Additional foil layers may also be provided within the annular spacing 116. Preferably, adjacent foils will extend in opposing circumferential directions in an alternating manner. However, the present invention may accommodate adjacent foil elements extending in the same direction. For example, the first and second foil elements 120 and 124 shown in FIGS. 2–4 may extend from the fin 130 or the bend 134 in the same circumferential direction with the spring 126 extending in an opposite circumferential direction and/or an additional foil element disposed concentric to and radially inwardly of the spring 126 extending in a circumferential direction opposite to that of the first and second foil elements 120 and 124. Additional foil elements would also preferably include flange portions attached to and forming the anti-rotation fin of the foil assembly.

The dimensions of the retaining member 112, the journal 114, the foil elements 120 and 124, and the spring 126 will, of course, depend on the application and expected loadings of the bearing 110. For example, a bearing 110 having a two-inch diameter may be employed in a 40,000 RPM turbocompressor unit for an air cycle air conditioning systems. The foil elements 120 and 124 for a two-inch diameter bearing may be on the order of 0.002 to 0.010 inches thick, and spring 126 may have approximately the same thickness. Similarly, the fin 130 or bend 134 preferably extends away from the foil elements in a radial direction at a length that will vary with the size and diameter of the bearing 110. As noted above, the slot 118 should have a shape and width complementary to the fin 130 and the spring flange portion 132, combined, or the bend 134 and the spring flange portion 132, combined. As further noted above, the depth of the slot 118 is preferably greater than the length of the fin 130 or the bend 134 so that there is a space (e.g., 0.030 inches) between the end of the fin 130 or the bend 134 and the bottom of the slot 118.

The method of forming the fin 130, of course, depends on the materials used in the foil elements 120 and 124. Welding and brazing are preferred where these elements are formed from metallic materials. Preferably, the foil elements 120 and 124, as well as the spring 126, are formed from INCONEL®, but may be manufactured from any aluminum or stainless steel.

The foregoing description of embodiments of the present invention has been presented for the purpose of illustration and description, and is not intended to be exhaustive or to limit the present invention to the form disclosed. As will be recognized by those skilled in the pertinent art to which the present invention pertains, numerous changes and modifications may be made to the above-described embodiments without departing from the broader aspects of the present invention.

What is claimed is:

1. A hydrodynamic fluid film bearing for rotatably supporting a shaft journal, comprising:
    a stationary retaining member having an inner surface defining a cylindrical opening for receiving a shaft journal, the inner surface including a longitudinally extending slot;
    a first generally cylindrical foil element disposed within and lining a portion of the cylindrical opening;
    a second generally cylindrical foil element disposed within and lining another portion of the cylindrical opening, the second foil element and the first foil element being attached to one another without a key and forming an anti-rotation fin extending generally radially towards the retaining member and being mounted within the slot of the retaining member; and
    a generally cylindrical resilient backing member disposed within the cylindrical opening generally concentric to and radially outward from the first and second foil elements;
    wherein the first and second foil elements extend in opposite circumferential directions within the cylindrical opening from the slot and have free ends overlapping one another.

2. The hydrodynamic fluid film bearing of claim 1, wherein the first and second foil elements extend in opposite circumferential directions from the slot within the cylindrical opening of the retaining member.

3. The hydrodynamic fluid film bearing of claim 1, wherein the first and second foil elements are welded together to form the fin.

4. The hydrodynamic fluid film bearing of claim 1, wherein the first and second foil elements are integrally connected to one another in the slot.

5. The hydrodynamic fluid film bearing of claim 1, wherein the resilient backing member includes a flange portion projecting from said resilient backing member in a radial direction generally normal to the circumferential direction thereof.

6. The hydrodynamic fluid film bearing of claim 5, wherein the flange portion of the resilient backing member is disposed within the slot to restrain the resilient backing member against rotation.

7. The hydrodynamic fluid film bearing of claim 5, wherein the flange portion of the resilient backing member is attached to the fin formed by the first and second foil elements.

8. The hydrodynamic fluid film bearing of claim 7, wherein the flange portion of the resilient backing member is welded to the fin.

9. The hydrodynamic fluid film bearing of claim 1, wherein the first foil element bears a low friction coating on the radial inner surface thereof.

10. The hydrodynamic fluid film bearing of claim 1, wherein the resilient backing member is a foil member having a corrugated form.

11. A keyless hydrodynamic fluid film bearing foil assembly adapted to be supported in a bearing housing for journaling of a shaft, comprising:

a first generally cylindrical foil element having a fin portion projecting from said first foil element in a radial direction generally normal to the circumferential direction thereof, and a flex portion extending from the fin portion in the circumferential direction; and a second generally cylindrical foil element having a fin portion projecting from said second foil element in a radial direction generally normal to the circumferential direction thereof, and a flex portion extending from the fin portion in the circumferential direction;

wherein the flex portions of the first and second foil elements have overlapping portions with the second foil element flex portion being disposed radially inwardly from the first foil element flex portion; and wherein the fin portion of the first foil element is attached to the fin portion of the second foil element to form an anti-rotation fin and the respective flex portions of the first and second foil elements extend from the fin in opposite circumferential directions.

12. The hydrodynamic fluid film bearing foil assembly of claim 11, wherein the respective fin portions of the first and second foil elements are welded together.

13. The hydrodynamic fluid film bearing foil assembly of claim 11, further comprising a resilient backing member extending in a generally circumferential direction and being disposed generally concentric to and radially outward from the first and second foil elements.

14. The hydrodynamic fluid film bearing foil of claim 13, wherein the resilient backing member further includes a fin portion projecting from said resilient backing member in a radial direction generally normal to the circumferential direction thereof and attached to the fin of the first and second foil elements.

15. The hydrodynamic fluid film bearing foil of claim 13, wherein the resilient backing member extends from the anti-rotation fin in the opposite circumferential direction from the radially adjacent foil element.

16. The hydrodynamic fluid film bearing foil of claim 13, wherein the resilient backing member extends from the anti-rotation fin in the same circumferential direction as the radially adjacent foil element.

17. A hydrodynamic fluid film bearing for rotatably supporting a shaft journal, comprising:

a stationary retaining member having an inner surface defining a cylindrical opening for receiving a shaft journal, the inner surface including a longitudinally extending slot;

a first generally cylindrical foil element disposed within the cylindrical opening;

a second generally cylindrical foil element disposed within the cylindrical opening generally concentric to the first foil element and being attached to the first foil element without a key to form an anti-rotation fin extending generally radially into the slot of the retaining member to be restrained from rotation;

wherein the first and second foil elements extend in opposite circumferential directions within the cylindrical opening from the slot and have free ends overlapping one another;

a generally cylindrical resilient backing member disposed within the cylindrical opening generally concentric to and radially outward from the first and second foil elements;

whereby enhanced coulomb damping is effected in the bearing by rubbing contact between the first foil element and the second foil element in opposite circumferential directions and by rubbing contact between the resilient backing member and at least one of the first and second foil elements in opposite circumferential directions of extension thereof.

* * * * *